United States Patent [19]
Park

[11] Patent Number: 5,275,054
[45] Date of Patent: Jan. 4, 1994

[54] RUBBER FREE FLUID PRESSURE TRANSDUCER

[75] Inventor: Kyong M. Park, Thousand Oaks, Calif.

[73] Assignee: Kavlico Corporation, Moorpark, Calif.

[21] Appl. No.: 44,267

[22] Filed: Apr. 7, 1993

[51] Int. Cl.$^5$ .................... G01L 7/08; G01L 9/12
[52] U.S. Cl. ........................ 73/724; 73/718; 361/283.1; 138/30
[58] Field of Search ............. 73/718, 724, 756, 706; 361/283; 92/103; 29/25.41, 595, 454; 138/30

[56] References Cited

U.S. PATENT DOCUMENTS

| | | | |
|---|---|---|---|
| 3,873,956 | 3/1975 | Kurtz et al. | 338/2 |
| 4,425,799 | 1/1984 | Park | 73/718 |
| 4,617,607 | 10/1986 | Park et al. | 361/283 |

Primary Examiner—Richard E. Chilcot, Jr.
Assistant Examiner—Joseph L. Felber
Attorney, Agent, or Firm—Poms, Smith, Lande & Rose

[57] ABSTRACT

A pressure transducer includes two plates of insulating, high strength low hysteresis material. At least one of the plates is thin so as to form a flexible diaphragm at the pressure levels to be measured. Both plates have a thin layer of conductive material on their facing surfaces. The diaphragm plate has a thin metallized layer fired onto its periphery on the opposite side from the conductive layer. The plates are bonded together and spaced apart by a peripheral layer of frit. This combination forms a capacitor which varies in capacitance as the diaphragm deflects. The capacitor is peripherally mounted to a shoulder within a plated fitting in a manner which allows fluid to enter a pressure chamber which applies fluid across the surface of the diaphragm. The peripheral mounting is accomplished by soldering the metallized layer to a shoulder on the fitting extending around the pressure chamber. Since the solder does not react with rubber deteriorating fluids, the pressure transducer may be used for measuring the pressure of fluids which deteriorate gaskets formed of rubber or similar materials.

14 Claims, 2 Drawing Sheets

RUBBER FREE FLUID PRESSURE TRANSDUCER

FIELD OF THE INVENTION

This invention relates to pressure transducers which are to be used with fluids which accelerate the decomposition of rubber and like materials.

BACKGROUND OF THE INVENTION

Capacitive pressure transducers are frequently used to determine the pressure of gases and liquids for purposes of measurement or control. Some examples of prior art pressure transducers include a dual diaphragm differential pressure transducer as shown in U.S. Pat. No. 4,680,971 (the '971 patent) issued Oct. 14, 1986 and which is assigned to the assignee of the present application; a liquid capacitance pressure transducer as shown in U.S. Pat. No. 4,425,799, (the '799 patent) issued Jan. 17, 1984, and also assigned to the assignee of the present application; and a capacitive pressure transducer as shown in U.S. Pat. No. 4,388,668 (the '688 patent) issued Jun. 14, 1983, also assigned to the assignee of the present invention.

The '668 patent and the '799 patent each disclose a pressure transducer including two insulating plates, one of which is a diaphragm, bonded together and spaced apart by glass frit. The inside surface of each plate is coated with a conductive material. This configuration creates a variable capacitor which varies in capacitance according to pressure applied to the diaphragm.

The '971 patent discloses a capacitive pressure transducer having two insulating plates, both of which are diaphragms, bonded to either side of a central base plate also made of inert insulating material, and having one or more openings therethrough. The two diaphragms are coupled together, by means fluid between the diaphragms or by means of a rod extending through the central opening in the base plate and secured to the centers of the two diaphragms. The inside of at least one of the diaphragms and the facing surface(s) of the base plate are coated with a conductive material. With this configuration, the capacitance between the conductive plates varies when the two diaphragms flex together.

It is well known in the field, as is evidenced by the teaching of the '971 and '799 patents, that a fitting (or housing) around the variable capacitor can be used to direct the flow of pressure to the appropriate plate(s) of the capacitor. It is also well known that some means of sealing the capacitor to the fitting is needed.

The sealing means employed in prior art, as evidenced by the teaching of the '971 and '799 patents, is accomplished by using rubber rings or rubber gaskets to seal the fitting around the periphery of the outer surface(s) of the diaphragm(s). This practice works well with many gasses and liquids (hereinafter referred to jointly as fluids). There are, however, fluids including certain gases employed in refrigeration systems, which tend to accelerate the decomposition of rubber and like materials. In the event that pressure transducers using seals of rubber or like materials are used with these rubber deteriorating fluids they will in time deteriorate and leak.

Accordingly, a principal object of the present invention is to provide an alternative transducer to be used with fluids that accelerate the decomposition of rubber and like materials.

BRIEF SUMMARY OF THE INVENTION

In accordance with the present invention, a rubber free fluid pressure transducer is provided by metallically bonding, and thereby sealing, the periphery of a diaphragm plate of a capacitive or resistive pressure transducer (or other sensor means) to the shoulder of a pressure chamber of a fitting by which a fluid is applied to the transducer. This metallic bond may for example be created by firing a metallized layer around the periphery of the diaphragm and soldering the metallized layer to the shoulder of the pressure chamber of the fitting.

The preferred embodiment of the invention may also include the following additional features:

1. The materials used for metallically bonding may be modified in composition or selected so that they will not decompose or corrode when exposed to the fluid with which the pressure transducer is to be used.
2. The diaphragm may control either the resistance of resistive material on the diaphragm or the capacitance of conductive plates.
3. Of the plates, one or more may be a diaphragm. An example of a single diaphragm unit is shown in U.S. Pat. No. 4,388,668. An example of a two diaphragm unit is shown in U.S. Pat. No. 4,680,971.

Advantages of the present invention include the fact that a rubber free pressure transducer will have a longer life than a traditional pressure transducer when used with fluids which accelerate the decomposition of rubber and similar materials. Additionally, since there is no rubber with which to react, the fluid will remain relatively uncontaminated.

Other objects, features and advantages of the present invention will become apparent from a consideration of the following detailed description, and from the accompanying drawings.

DETAILED DESCRIPTION OF THE PREFERRED EMBODIMENT

Figure 1:
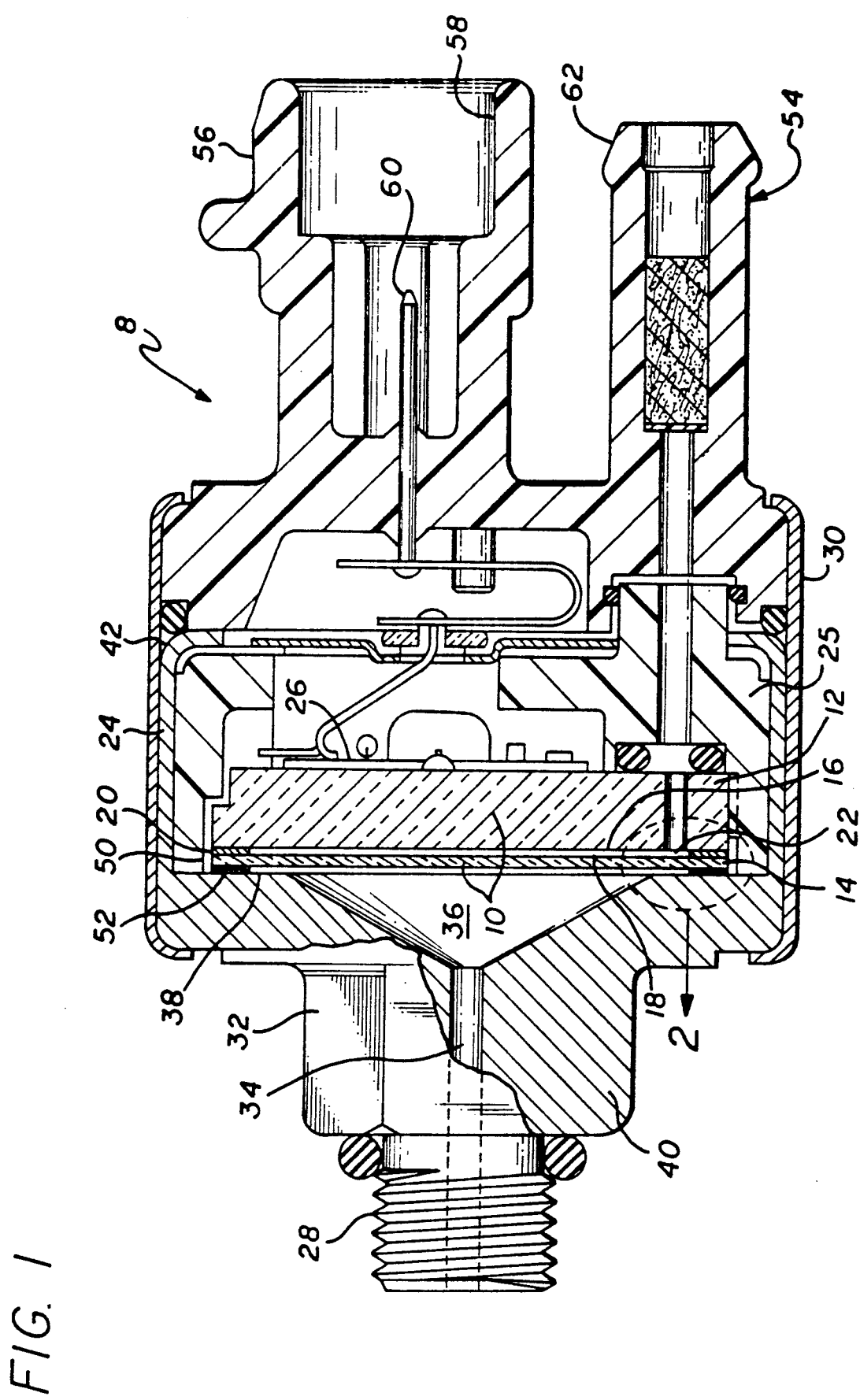
FIG. 1 is a longitudinal cross sectional view of a pressure transducer embodying the present invention.

Referring more particularly to the drawings, FIG. 1 is a longitudinal cross sectional view of a pressure transducers. This pressure transducer is comprised of a fitting (or housing) 40 containing a sensor 10. The sensor 10 includes two non-conductive plates 12 and 14 made of any suitable insulating material which has low hysteresis and good stability. Typical materials which may be used include quartz, alumina, glass or other ceramic materials, with alumina being preferred. Plates 12 and 14 may be generally circular in configuration. Although the size of the plates would be determined by the use of the transducer, a typical diameter would be about ⅜ of an inch. The two plates and 14 could both be relatively thin so that they could act as diaphragms, or as shown in FIG. 1, the plate 12 may be relatively thick, while the plate 14 may be very thin so that it may act as a single diaphragm, and flex when there are changes in pressure across its surface.

For completeness, reference is made to U.S. Pat. No. 4,329,732, granted on May 11, 1982, assigned to the assignee of the present invention, which discloses and describes in some detail a capacitive transducer similar to that shown in FIG. 1 for use in measuring the pressure of gasses. U.S. Pat. No. 4,425,799, granted on Jan. 17, 1984, and also assigned to the assignee of the present invention, discloses and describes in some detail a capacitive transducer similar to that shown in FIG. 1 for use in measuring liquid-to-liquid pressure. However, with regard to the techniques for fabricating the assembly of two plates, at least one of which is a diaphragm, the disclosures of the two above-identified U.S. patents are hereby incorporated by reference.

Figure 2:
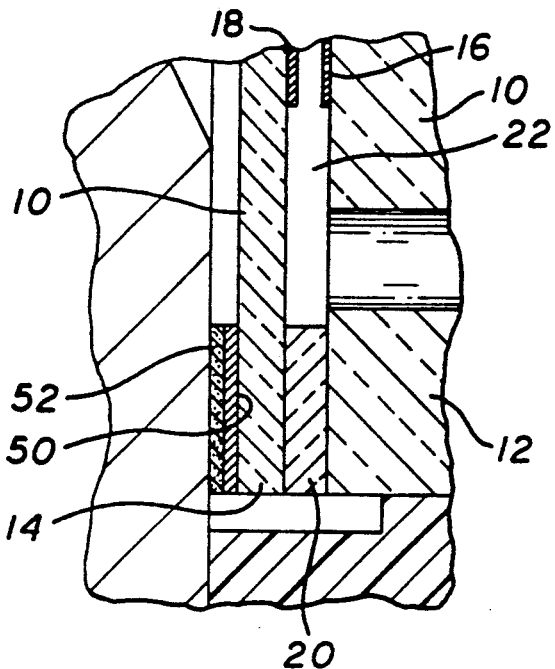
FIG. 2 is a partial cross sectional view of the layers of the transducer.

On one side of each of the plates 12 and 14, there is a thin coating of conductive material 16 and 18 best seen in FIG. 2. These coatings may be screened onto the surfaces of the plates and fired. They may be screened on in the form of conductive pastes, or, they could be in the form of tin oxide, by way of specific examples. The fired conductive layer may be formed of copper, gold, or tin oxide, for example.

As shown in FIG. 2 the plates 12 and 14 are spaced apart and sealed together, with the coating of conductive material 16 and 18 on the inner opposed surfaces, by a peripheral frit 20 of glass, or other nonconductive material. In practice this peripheral frit layer 20 and the plates 12 and 14 are preferably of substantially similar material from the standpoint of coefficient of thermal expansion. This configuration forms a gap 22 between the conductive coatings 16 and 18. By way of example, the frit may be made of glass particles having two different melting points. With the firing of the glass frit being accomplished at a temperature intermediate the melting points of the two glasses included in the glass frit, the two plates 12 and 14 may be accurately spaced apart in accordance with the size of the particles included in the higher melting point glass frit 20. In practice, the spacing between the plates 12 and 14 may be in the order of from $\frac{1}{2}$ of a thousandth of an inch up to about 20 thousandth of an inch, with a spacing of between one and two thousandths of an inch being practical for many applications. Concerning the thickness of the diaphragm, it may vary depending on the pressures to be measured and the diameter thereof, but may typically have a thickness of between ten and twenty thousandths of an inch.

As described above and shown in FIG. 1 and FIG. 2, because of the frit 20, the two plates 12 and 14 cooperatively define a very thin disk-like gap 22. Those with ordinary skill in the pertinent arts will recognize that the gap 22 may be sealed and substantially evacuated, or may receive, by way of example, a gas or a mixture of gasses at a reference pressure level, or may have another gas supplied to it, or may be open to the atmosphere.

Figure 3:
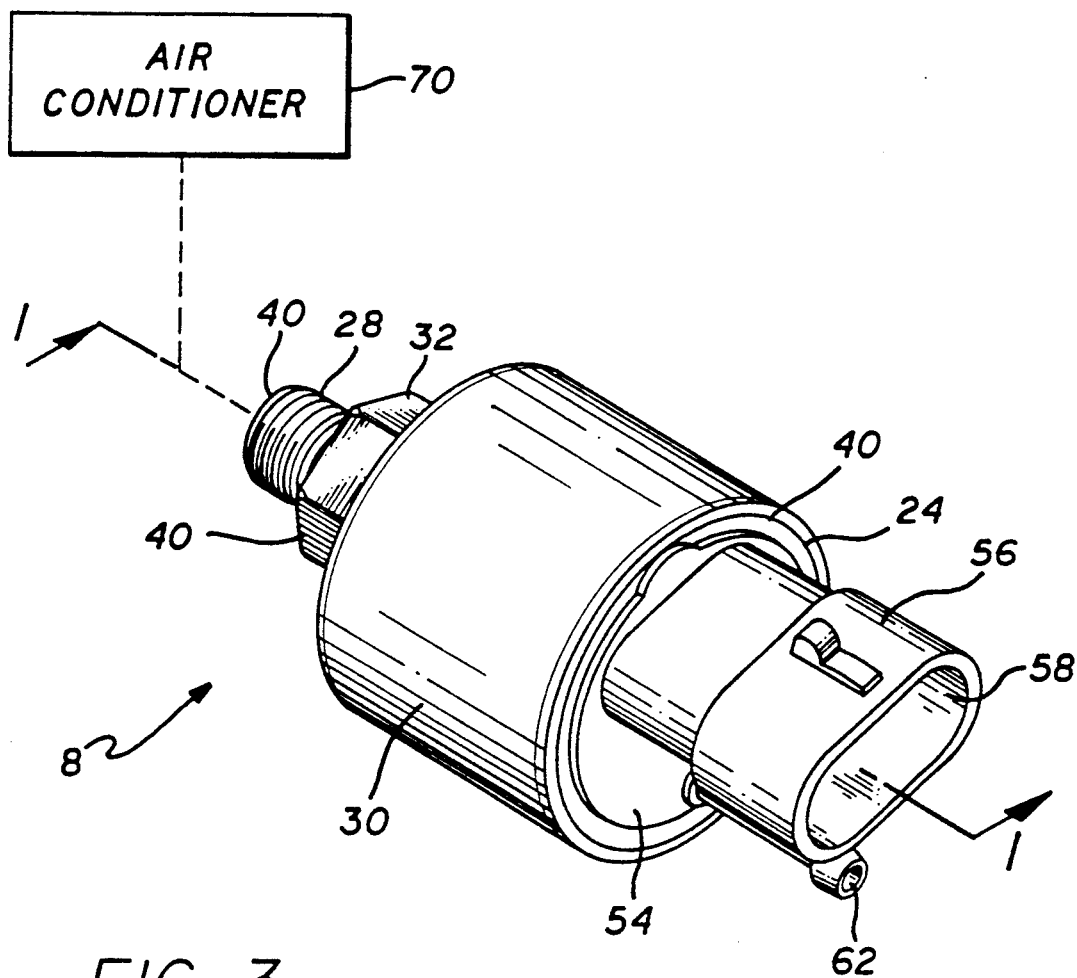
FIG. 3 is a perspective view of the transducer shown schematically attached to a refrigerator unit.

FIG. 1 shows the above described plate combination contained within a fitting 40. FIG. 1 and FIG. 3 show the cylindrical fitting 40 with a solder-bonding metallic finish 42. By way of example, the fitting 40 could be made of carbon steel and covered with tin plating 42 functioning as the solder-bonding. Another acceptable composition would be the fitting 40 formed of carbon steel and having a basic cadmium plating with a chrome finish 42. In practice, the diameter of the fitting would vary based on its application, but a 1 inch diameter would be appropriate for use with plates 12 and 14 having a 162 inch diameter.

Looking at FIG. 1 and FIG. 3 the features of the pressure transducer 8 include a somewhat cup-shaped metallic high pressure fitting 40 (for coupling with an external fluid source such as a refrigeration unit 70 as shown in FIG. 3), a molded polymer or plastic connector member 54, a metallic connector sleeve 30 which secures the fitting 40 and the connector 54, and an inner spacer 25 which enters the sensor 10 to face the pressure chamber 36.

In the preferred embodiment of the invention, the fitting 40 includes (as shown in FIG. 1 and FIG. 3 from left to right) a threaded nipple portion 28, a hexagonal wrenching portion 32, and an axially extending cylinder 24. The fitting serves the dual purpose of housing the sensor 10 and coupling with an external fluid source such as a refrigeration unit 70. Those ordinarily skilled in the pertinent arts will recognize that the fitting 40 be embodied in variety of different forms and still accomplish the stated goals.

One embodiment of the connector member 54 is shown in FIG. 1 and FIG. 3. These figures show the connector member 54 defining a connector boss 56 with a cavity 58 into which projects three connector pins 60 for receiving electrical power and providing a signal indicative of a measured pressure level, and a low pressure hose fitting 62. Those ordinarily skilled in the pertinent arts will recognize that the connector member 54 may include or carry a variety of different connectors. Thus, the pressure sensor 10 is not limited to refrigeration uses, but may find application also to industrial and aerospace uses, for example. The connector 54 is secured to the fitting 40 by means of an external metallic connector sleeve 30.

Looking at FIG. 1 and starting at the left side, the internal features of the pressure transducer 8 include a passage 34 (defined externally by the nipple portion 28 and best seen in FIG. 1), a pressure chamber 36 an axially extending cylinder 24, and a molded polymer connector member 54. The axially extending cylinder 24 contains within it the sensor 10 and a circuit 26 for processing the changes in capacitance and providing an output signal. The output signal may take the form of a linear change in voltage depicting a change in pressure.

The pressure chamber 36 is a funnel shaped passage which directs the fluid applied through the passage 34 from the fluid source 70 to the diaphragm plate 14 of the sensor 10 (best seen in FIG. 3). As seen in FIG. 1, the sensor is mounted within the axially extending cylinder 24 and on the shoulder 38 which is perpendicular to the inside of the cylinder 24. The shoulder 38 extends outward along the periphery of the pressure chamber 36 to the inner surface of the wall of the cylinder 24. This flat peripheral shoulder 38 is not embodied in prior art which would have required a groove or other means to accommodate a rubber O-ring or gasket.

To bond, and thereby seal, the diaphragm 14 of the sensor 10 to the shoulder 38 of the fitting 40 (as best shown in FIG. 1) a two step process is used. First, a thin metallized layer 50 is fired onto periphery of the outside of the diaphragm plate 14. Incidentally, this may be accomplished prior to the assembly of the two plates 12 and 14. Second, the metallized layer is soldered at 52 to the shoulder 38 of the fitting 40. The solder 52 and the metallized layer 50 are best seen in FIG. 2. Whereas the placement of the sensor 10 in relation to the shoulder 38 is best seen in FIG. 1.

The thin metallized layer 50 is made up of a composition of metals including, by way of example, approximately 95% silver and 5% lead. An appropriate material is available from DuPont. This metal is then fired onto the periphery of the outside of the diaphragm plate 14 by heating the unit to approximately −850° C. for approximately ten minutes.

To bond the metallized layer 50 to the shoulder 38 of the fitting 40, a thick film paste of flux and particles of solder is applied and then heated. The solder can be comprised of, by way of example, 63% lead, 35% tin, and 2% silver or, in alternatively, the solder composition could be comprised of approximately 36% lead, 60% tin, and 4% silver. These solder compositions melt at approximately 179° C. to 246° C. Kester Solder of Chicago Ill. manufactures solder of these compositions and associated flux for use with the solder.

After application of the solder paste 52 to the metallized layer 50 of the exterior of the diaphragm 14 of the sensor 10, the sensor is inserted into the fitting 40 so that the solder paste 52 rests on the shoulder 38 of the fitting 40. The fitting 40 and the sensor 10 within are then heated to approximately 200° C. to 250° C. When the layer of solder paste melts, a solder bond 52 is created which effectively seals the sensor 10 to the shoulder 38 of the fitting 40.

The composition of the materials used for metallically bonding the plates 12 and 14 of the sensor 10 to the shoulder 38 of the fitting 40 may be modified in composition so that it will not decompose or corrode when exposed to the fluid with which the pressure transducer is to be used.

As described, the preferred embodiment of the invention includes a rubber free method of sealing a sensor to a fitting. This method can be applied to a single side of a single diaphragm when the pressure transducer is to measure the pressure of a single rubber deteriorating fluid. Similarly, the method may be applied to both sides of a single sensor in a differential pressure geometry when a single rubber deteriorating fluid is to be applied to one side of the diaphragm, and the other side of the diaphragm is to be exposed to another rubber deteriorating fluid. Or the method could be used with a dual diaphragm pressure transistor (of the tape shown in U.S. Pat. No. 4,680,971) when the differential pressure between two rubber deteriorating fluids is to be compared.

In conclusion, it is to be understood that the present invention is not to be limited to that precisely as described hereinabove and as shown in the accompanying drawings. More specifically, the circular shape of the plates 12 and 14 could be modified and replaced with square shaped plates. In addition, it is to be understood that the dimensions as included in the present disclosure may be varied, to accommodate the different pressure ranges which may be employed, and different materials may be utilized. Further, instead of bonding the diaphragm to a shoulder on the fitting, the metallic bond may be accomplished at the corner of the diaphragm or around the outer periphery thereof. Finally, other sensing means may be used. One such alternative sensing means would involve the use of resistive elements on the surface of the diaphragm to detect pressure changes. Accordingly, the present invention is not limited to the arrangements precisely as shown and described hereinabove.

What is claimed is:

1. A pressure transducer for measuring the pressure of fluids which deteriorate gaskets formed of rubber or similar materials, comprising:

first and second plates of insulating, high strength low hysteresis material, one of said plates being thin to form a flexible diaphragm at the pressure levels to be measured, said plates having facing conductive surfaces forming a capacitor which varies in capacitance as the diaphragm deflects, said insulating plates being bonded together and spaced from one another around the peripheries thereof;

a fitting for applying fluid to said diaphragm, said fitting including a pressure chamber for applying said fluid across the surface of said diaphragm;

said fitting having a shoulder for engaging the outer periphery of said diaphragm; and said diaphragm being metallically bonded to and sealed to said fitting around the periphery of said diaphragm and in engagement with said shoulder.

2. A rubber free pressure transducer as defined in claim 1, wherein a means for metallically bonding said diaphragm to said fitting includes a fired metallized layer around the periphery of said flexible diaphragm.

3. A rubber free pressure transducer as defined in claim 2, wherein said means for metallically bonding said diaphragm to said fitting further includes a soldered seal between said metallized layer around the periphery of said flexible diaphragm to said shoulder of said pressure chamber of the fitting.

4. A system as defined in claim 1, further comprising:

said fitting including an input coupling to said pressure chamber; and an apparatus containing rubber deteriorating fluids coupled by said input coupling to said pressure chamber of said fitting.

5. A rubber free pressure transducer, comprising:

first and second plates of insulating, high strength low hysteresis material, at least one of said plates being a flexible diaphragm;

electrical sensor means at least partially mounted on said diaphragm, wherein said electrical sensor means changes its electrical properties in relation to the degree of flexing of said diaphragm;

a fitting for directing fluid to said flexible diaphragm, said fitting including a pressure chamber for applying said fluid across the surface of each said flexible diaphragm;

said fitting having a peripheral engaging surface around said pressure chamber for engaging the outer periphery of said flexible diaphragm; and means for metallically bonding and sealing the periphery of said flexible diaphragm to said peripheral engaging surface of said fitting.

6. A rubber free pressure transducer as defined in claim 5, wherein said means for metallically bonding includes a fired metallized layer around the periphery of said flexible diaphragm.

7. A rubber free pressure transducer as defined in claim 6, wherein said means for metallically bonding further includes a soldered seal between said metallized layer around the periphery of said flexible diaphragm to said shoulder of said pressure chamber of the fitting.

8. A rubber free pressure transducer as defined in claim 7 wherein said fitting includes an outer solder-bonding coating.

9. A rubber free pressure transducer as defined in claim 5, wherein said fitting includes means for connecting a fluid source to said pressure chamber.

10. A system as defined in claim 5, further comprising:

an apparatus containing rubber deteriorating fluids coupled to said fitting, whereby the pressure of said fluid may be measured by said transducer.

11. A rubber free pressure transducer as defined in claim 5, wherein said peripheral engaging surface is a shoulder which extends outward along the periphery of said pressure chamber to the inner surface of the wall of said fitting and which is perpendicular to the walls of said fitting.

12. A rubber free pressure transducer as defined in claim 5, wherein said peripheral engaging surface is the outer periphery of the diaphragm.

13. A rubber free pressure transducer as defined in claim 5, wherein said electrical sensor means is comprised of:
   a thin conductive layer deposited on the facing surfaces of said plates; and
   means for bonding said plates together and spacing them apart.

14. A rubber free pressure transducer as defined in claim 5, further comprising a connector member for coupling to said electrical sensor means.

* * * * *